United States Patent [19]
Fenton, Sr.

[11] Patent Number: 5,214,987
[45] Date of Patent: Jun. 1, 1993

[54] SCREW FASTENER AND DRIVING TOOL

[76] Inventor: John J. Fenton, Sr., 34 Balfour Dr., Wappinger Falls, N.Y. 12590

[21] Appl. No.: 868,240

[22] Filed: Apr. 14, 1992

[51] Int. Cl.$^5$ .............................................. B25B 23/10
[52] U.S. Cl. ...................................... 81/460; 411/395; 411/404; 411/410; 81/463
[58] Field of Search ................ 81/436, 460, 461, 463; 411/395, 402–404, 410

[56] References Cited

U.S. PATENT DOCUMENTS

| | | | |
|---|---|---|---|
| 1,159,779 | 11/1915 | Landau | 411/395 |
| 2,053,864 | 9/1936 | Cook et al. | 411/395 |
| 2,173,707 | 9/1939 | Brown | 81/460 |
| 2,969,250 | 1/1961 | Kull | 81/460 |
| 4,858,504 | 8/1989 | Tsai | 81/463 |

FOREIGN PATENT DOCUMENTS

| | | | |
|---|---|---|---|
| 886061 | 1/1962 | United Kingdom | 411/411 |
| 2092253 | 8/1982 | United Kingdom | 411/403 |

Primary Examiner—J. J. Swann
Attorney, Agent, or Firm—E. Michael Combs

[57] ABSTRACT

A screw fastener and a tool for driving the screw fastener is disclosed. The screw fastener has a polygonal driving socket in its head, the driving socket having a substantially square first section and a second section including a rectangular slot radiating outwardly from the center of each side wall of the first section. The depth of the first and second sections are the same. Further, the screw fastener may be provided with internal ducts for conveying lubricant into a workpiece hole in which the fastener is being turned. A driving tool having a square shank for turning the screw fastener is also disclosed. One end of the tool's shank has a driving section comprising a rectangular fin extending longitudinally along and radiating outwardly from the center of each side wall of the shank. The shape of the driving section is complementary in shape to, and dimensioned to be snugly received in, the driving socket. Additionally, the driving tool may be provided with internal reservoir and duct means to convey lubricant through the fastener and into a workpiece hole.

7 Claims, 4 Drawing Sheets

SCREW FASTENER AND DRIVING TOOL

BACKGROUND OF THE INVENTION

1. Field of the Invention

The field of the invention relates to a fastener and a tool for driving the fastener, and more particularly to a screw fastener with a head having a configuration which is engagable with a driving tool having an element shaped complementary to the fastener head to interlock with it and thus drive the screw.

2. Description of the Prior Art

Many screw fastener and screwdriver combinations having complementary shaped engaging or driving elements are known in the prior art. Some of the most common types of screw fasteners presently in use are the slotted, "Allen", "Phillips", and "Torx" head screws. However, the head configurations of these prior art screw fasteners are all subject to rounding and distortion of their driving surfaces and corners due to the axial pressure and high torque applied to them by the screwdriver during their engagement, causing slippage and disengagement of the fastener and the screwdriver. Accordingly, once the driving means of the fastener head becomes distorted, it cannot be driven in either direction, which thus requires a time consuming and costly removal procedure such as drilling which can be particularly difficult when using hardened fasteners, since such fasteners may require the use of tungsten carbide drills to be removed.

Various fastener and driving tool combinations have been utilized in the prior art. For example, U.S. Pat. No. 4,311,071 to Bassil sets forth a screwdriver and screw system wherein the screw head is provided with a driving configuration comprising a pair of opposed protruding sectors, each sector having a pair of setback or undercut side walls, said sectors protruding from a flat top surface. A screwdriver has a driving blade having a pair of opposed, outwardly slanted side walls which are selectively engagable with one side wall of each opposing sector when the screwdriver is placed in either of two diametral positions.

U.S. Pat. No. 4,526,071 to Post illustrates another screwdriver and screw fastener combination comprising a screw having a driving head provided with a diametral and a chordal slot. A screwdriver has a driving blade with a laterally extending bit shaped for reception into the chordal slot, and a narrow tip portion on the blade end adjacent to the bit which is positionable in the diametral slot to effect turning of the fastener. Further, a spring clip is provided to retain the screwdriver and fastener in engagement during turning.

U.S. Pat. No. 4,590,825 to Vaughn discloses another screw fastener and driving tool arrangement wherein the frusto-conical head of the screw is provided with a bow-tie shaped driving slot in its driving face. A conical recess is positioned centrally in the driving slot. A driving tool is provided with a driving tip on its end which is shaped complementary to the screw head driving slot to effect centered engagement of the screw and the tool for subsequent driving of the screw.

U.S. Pat. No. 4,858,504 to Tsai discloses a screwdriver having an insulated handle, an insulated block, and a polygonal wrench-engaging head mounted on one end of its shank whereby the screwdriver may be either driven by turning the handle or by attaching another manual or power tool to the head. The insulated handle and block protect an operator from electrical shock. Further, the screwdriver may be used with a hammer as a chisel device to loosen fasteners.

U.S. Pat. No. 4,936,172 to Jackson illustrates still another combination screw and screwdriver wherein the screw is constructed with a slotted driving head for receiving a screwdriver having a drive tip configured with a shape complementary to the head slot. The mating head slots and driver tips are basically rectangular with a plurality of angular contacting wall surfaces.

As such, it may be appreciated that there continues to be a need for a new and improved screw fasteners and driving tools which addresses both the problems of ease of use, portability, and effectiveness in construction, and in this respect, the present invention fulfills this need.

SUMMARY OF THE INVENTION

In view of the foregoing disadvantages inherent in the known types of fasteners and driving tools now present in the prior art, the present invention provides a screw fastener having a driving socket in its head, wherein the driving socket is dimensioned to closely receive a portion of a driving tool which is shaped complementary to the driving socket to effect turning of the fastener. As such, the general purpose of the present invention, which will be described subsequently in greater detail, is to provide a new and improved screw fastener and driving tool which has all the advantages of the prior art fasteners and driving tools and none of the disadvantages.

To attain this, the present invention includes a screw fastener having a polygonal driving socket in its head, the driving socket comprising a substantially square first section and a second section including a rectangular slot radiating outwardly from the center of each side wall of the square first section. The rectangular slots intersect each side wall and open into the square first section. The depth of the square first section and the rectangular slots of the second section are the same. Further, the screw fastener may be provided with internal ducts for conveying lubricant into a hole in which the fastener is being turned. A driving tool for turning the screw fastener is also disclosed, the driving tool having a square shank. One end of the tool's shank has a rectangular fin radiating outwardly from the center of each side wall of the shank, wherein the axial length of the fins and the adjacent square shank portion define a tool driving section which is complementary in shape to, and dimensioned to be snugly received in, the polygonal drive socket of the screw fastener. Additionally, the driving tool may be provided with internal lubricant reservoir and duct means to convey lubricant through the screw fastener ducts and into the workpiece hole.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the included abstract is to enable the U.S. Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The abstract is neither intended to define the invention of the application, which is measured by the claims, nor is it intended to be limiting as to the scope of the invention in any way.

It is therefore an object of the invention to provide a new and improved screw fastener and driving tool which has all the advantages of the prior art fasteners and driving tools and none of the disadvantages.

It is another object of the present invention to provide a new and improved screw fastener and driving tool which may be easily and efficiently manufactured and marketed.

It is a further object of the present invention to provide a new and improved screw fastener and driving tool which is of durable and reliable construction.

An even further object of the present invention is to provide a new and improved screw fastener and driving tool which is susceptible of a low cost of manufacture with regard to both materials and labor, and which accordingly is then susceptible of low prices of sale to the consuming public, thereby making such screw fasteners and driving tools economically available to the buying public through convenient hardware stores, appropriate catalogs, as well as do-it-yourself home improvement centers.

Still yet another object of the present invention is to provide a new and improved screw fastener and driving tool which provides in the apparatuses and methods of the prior art some of the advantages thereof, while simultaneously overcoming some of the disadvantages normally associated therewith.

Still another object of the present invention is to provide a new and improved screw fastener and driving tool wherein the configuration of their mating drive socket and shank drive section, respectively, provide an area of increased surface contact between them which thus enables a greater application of torque and a more facile turning of the fastener while ensuring that the screw fastener and the driving tool remain engaged.

Yet another object of the present invention is to provide a new and improved screw fastener and driving tool wherein the configuration of their mating drive socket and shank drive section, respectively, enable a more precise placement of the drive section into the drive socket which in turn increases the stability of their driving connection and reduces any chance of slippage therebetween and damage to the screw head.

Even still another object of the present invention is to provide a new and improved screw fastener and driving tool which have internal lubricant storage and delivery means to convey lubricant into a threaded or unthreaded hole to more easily drive the screw fastener in either rotative direction therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1-18 thereof, a new and improved screw fastener and driving tool embodying the principles and concepts of the present invention, and generally designated by the reference numerals 10, 10', 48, 50, 54, 54', 60, 66, 76, and 90, will be described.

Figure 1:
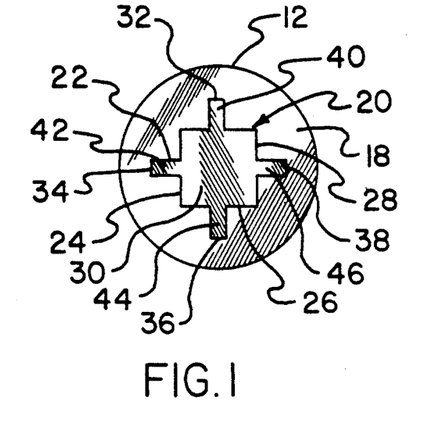
FIG. 1 is top plan view of a first embodiment of the screw fastener of the present invention.
Figure 2:
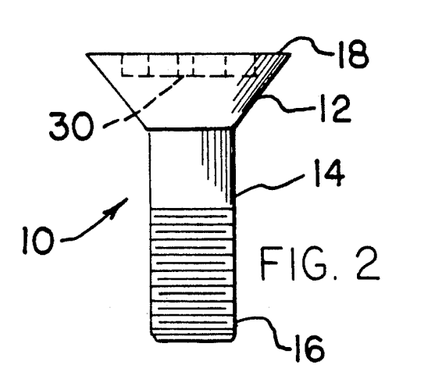
FIG. 2 is side view of the screw fastener of the first embodiment of the present invention.

More specifically, and with particular reference to FIGS. 1 and 2, a screw fastener 10 of a first embodiment of the present invention essentially comprises a frustoconical head 12 formed on one end of a shank 14 and a threaded section 16 formed on the opposite end of the shank 14. The threaded section 16 may be configured in a wide variety of conventional shapes, thus adapting it for any common use such as a wood, sheet metal, or machine screw. Head 12 has a planar driving end face 18 at its outer end. Extending inwardly from driving end face 18 into head 12 is a polygonal driving socket 20 which is centered about the axis of the screw 10. Driving socket 20 comprises a square first section including inwardly extending flat side walls 22,24,26,28 which terminate at a flat bottom wall 30, and a second section including equally sized, inwardly extending and relatively narrow rectangular slots 32,34,36,38 having side walls which terminate at flat bottom walls 40,42,44,46, respectively. Rectangular slots 32,34,36,38 intersect with flat side walls 22,24,26,28, respectively, and thus open into said square first section, and further radiate outwardly from the center of said side walls. Flat bottom walls 30,40,42,44,46 are coplanar and thus provide a common flat bottom surface for the driving socket 20. The dimensions of driving socket 20, including its depth, are proportioned according to the size of the fastener to assure that the proper torque may be applied to it without slippage and wear, and that separation from a driving tool will not occur.

Figure 3:
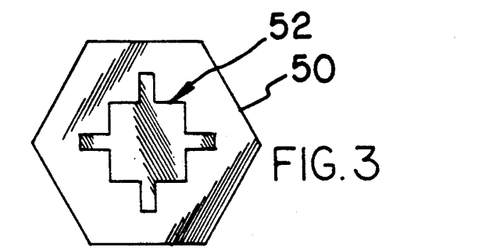
FIG. 3 is a top plan view of a second embodiment of the screw fastener of the present invention.
Figure 4:
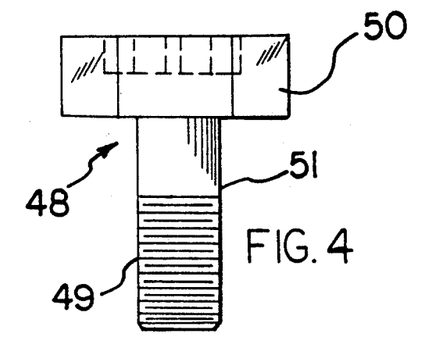
FIG. 4 is a side view of the screw fastener of the second embodiment of the present invention.

Referring now to FIGS. 3 and 4, a second embodiment of the screw fastener of the present invention is illustrated. Screw fastener 48 has a threaded section 49 on one end of its shank 51, and on the opposite end of shank 51 a hexagonal head 50 is provided with a centrally positioned polygonal driving socket 52 therein which is structurally identical to driving socket 20 of screw fastener 10 of the first embodiment.

Figure 5:
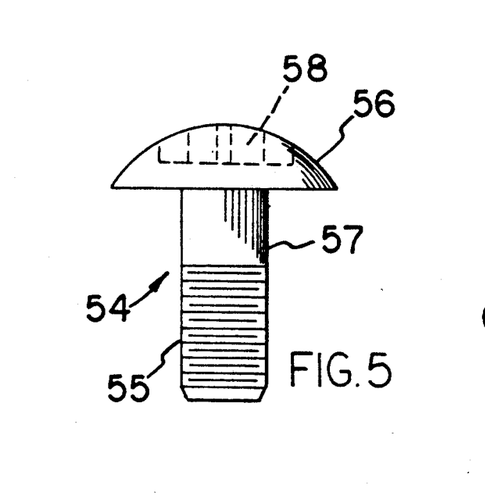
FIG. 5 is a side view of a third embodiment of the screw fastener of the present invention.

FIG. 5 shows a third embodiment of the screw fastener of the present invention. Screw fastener 54 has a threaded section 55 on one end of its shank 57, and on the opposite end of shank 57 a dome-shaped head 56 is provided with a centrally positioned polygonal driving socket 58 therein which is structurally identical to driving socket 20 of screw fastener 10 of the first embodiment.

Figure 6:
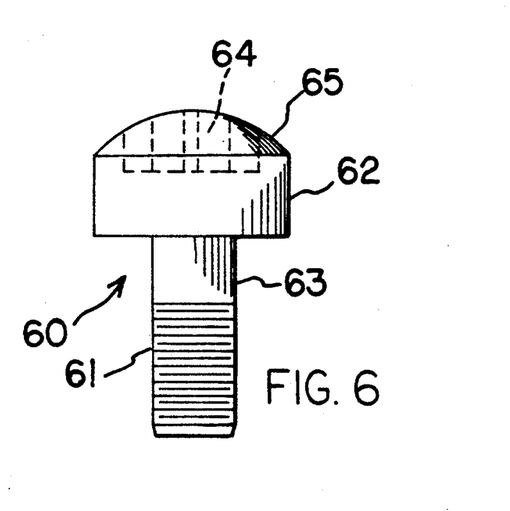
FIG. 6 is a side view of a fourth embodiment of the screw fastener of the present invention.

FIG. 6 illustrates a fourth embodiment of the screw fastener of the present invention wherein screw fastener 60 has a threaded section 61 on one end of its shank 63, and on the opposite end of shank 63 a head composed of a cylindrical section 62 and a dome-shaped section 65 extending upwardly from section 62. The head is provided with a centrally positioned polygonal driving socket 64 which is structurally identical to driving socket 20 of screw fastener 10 the first embodiment.

Figure 7:
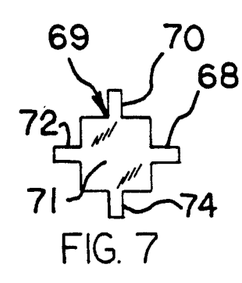
FIG. 7 is an end view of a first embodiment of a driving tool of the present invention.
Figure 8:
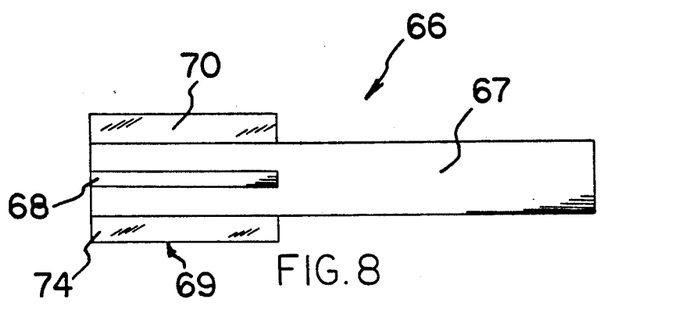
FIG. 8 is a side view of the first embodiment of the driving tool of the present invention.

With reference to FIGS. 7 and 8, a first embodiment of a tool of the present invention for driving any of the screw fasteners illustrated in FIGS. 1-6 is shown. Driving tool 66 is constructed as a drill bit and has a square shank 67. On one end of shank 67 four equally sized rectangular drive fins 68,70,72,74 are provided. Each of the drive fins 68,70,72,74 is integral with one of the four side walls of shank 67, respectively, and radiates outwardly from the center of each respective side- wall. The drive fins 68,70,72,74 extend inwardly from end face 71 of shank 67 and longitudinally along their respective shank 67 side walls for a length at least equal to, and preferably slightly greater than, the depth of the rectangular slots of driving sockets 20,52,58, or 64. Together with the adjacent portion of shank 67, drive fins 68,70,72,74 define a screw fastener driving section 69. The end of shank 67 opposite to driving section 69 is adapted for insertion into a drill chuck for powered turning of the screw fastener.

Figure 9:
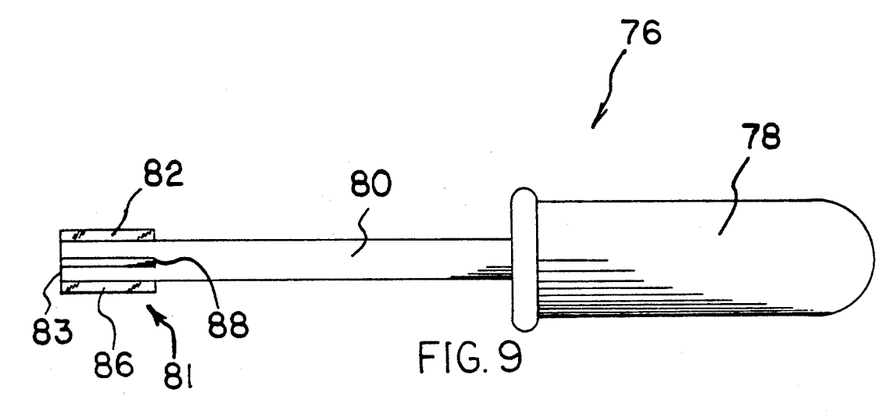
FIG. 9 is side view of a second embodiment of the driving tool of the present invention.
Figure 10:
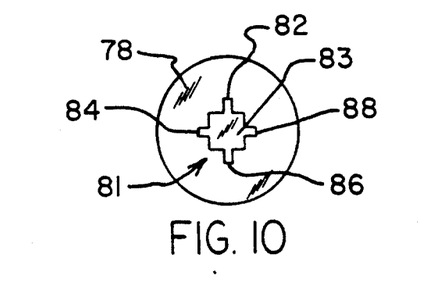
FIG. 10 is an end view of the second embodiment of the driving tool of the present invention.

FIGS. 9 and 10 depict a second embodiment of a tool of the present invention for driving any one of the screw fasteners of FIGS. 1-6. Driving tool 76 is configured for manual operation and comprises a handle 78 on one end of a square elongate shank 80 for turning the tool, and a screw fastener driving section 81 on the opposite end of said shank 80. Driving section 81 is composed of four equally sized rectangular drive fins 82,84,86,88 and the adjacent portion of shank 80, said drive fins extending inwardly from the end face 83 of shank 80. Driving section 81 is structurally identical to driving section 69 of driving tool 66.

In use, either driving section 69 of driving tool 66 or driving section 81 of driving tool 76 is fully inserted into a selected driving socket 20,52,58,64 of a screw fastener 10,48,54,60 positioned in a workpiece hole, respectively, i.e. so that end faces 71, 83 of driving tools 66,76, respectively, are in surface contact with the flat bottom surface of one of said driving sockets defined by flat bottom walls 30,32,34,36,38. A selected screw fastener is then turned in either rotative direction.

Figure 13:
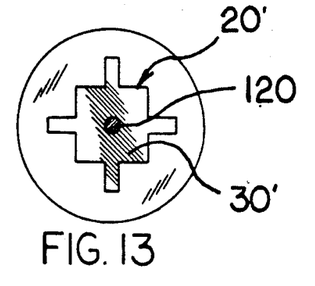
FIG. 13 is a top plan view of a fifth embodiment of the screw fastener of the present invention.
Figures 14, 16, 17, 18, 19:
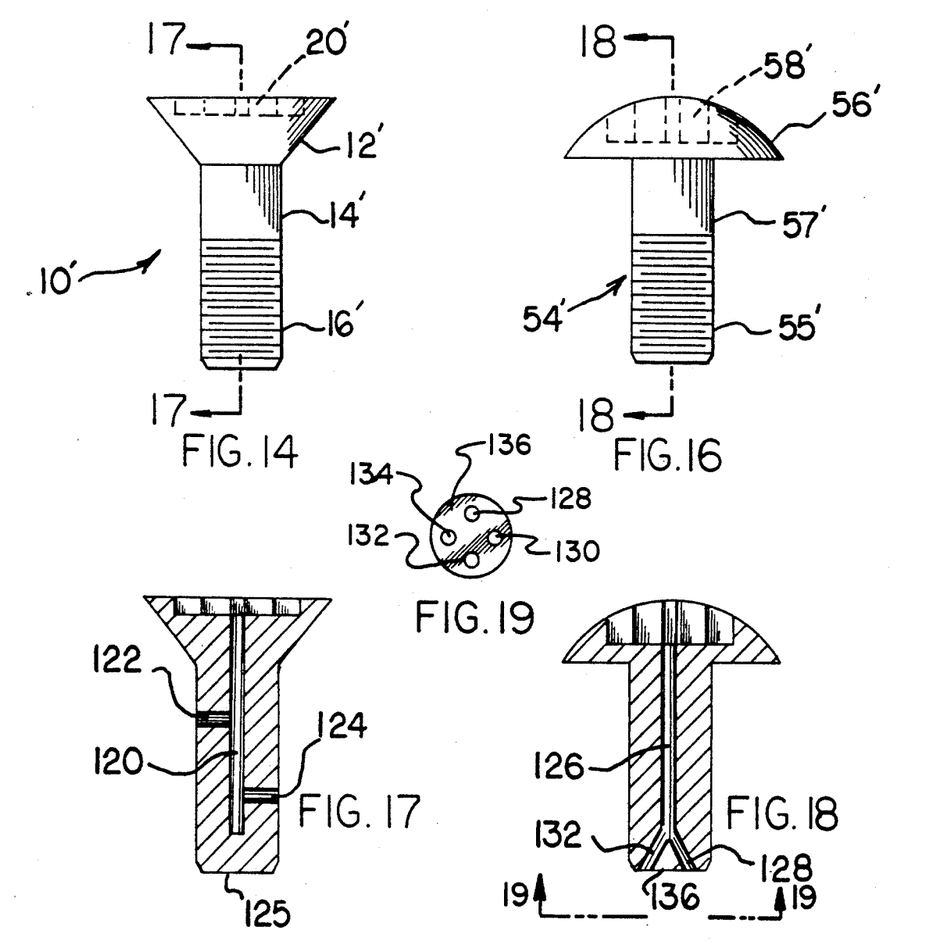
FIG. 14 is a side view of the fifth embodiment of the screw fastener of the present invention.
FIG. 16 is a side view of the sixth embodiment of the screw fastener of the present invention.
FIG. 17 is a cross-sectional view of the fifth embodiment of the screw fastener of the present invention taken along line 17—17 in FIG. 14.
FIG. 18 is a cross-sectional view of the sixth embodiment of the screw fastener of the present invention taken along line 18—18 in FIG. 16.
FIG. 19 is a bottom plan view of the sixth embodiment of the screw fastener of the present invention.
Figure 15:
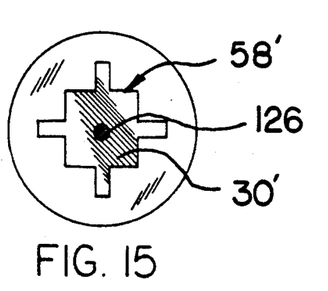
FIG. 15 is a top plan view of a sixth embodiment of the screw fastener of the present invention.

FIGS. 13, 14, and 17 illustrate a fifth embodiment of the screw fastener of the present invention. Screw fastener 10' is substantially identical in structure to screw fastener 10 of the first embodiment shown in FIGS. 1 and 2. Additionally, screw fastener 10' is provided with internal means for delivering lubricant to a workpiece hole in which the fastener is being turned. More specifically, a lubricant duct 120 is positioned along the central axis of the fastener 10' and extends longitudinally from flat bottom wall 30' of driving socket 20' to an end spaced axially from bottom end face 125 of shank 14' at the lower end of threaded section 16'. Further, a pair of lubricant ducts 122 and 124 extend radially outwardly from duct 120 and terminate at the outer surface of shank 14'. Ducts 122 and 124 are axially spaced along duct 120 to distribute the lubricant along the length of the workpiece hole.

FIGS. 15, 16, 18, and 19 show a sixth embodiment of the screw fastener of the present invention. Screw fastener 54' is substantially identical to screw fastener 54 of the third embodiment shown in FIG. 5. Further, fastener 54' is provided with a lubricant duct 126 positioned along its central axis, said duct 126 extending longitudinally from flat bottom wall 30' of driving socket 58' to an end spaced axially from bottom end face 136 of the shank 57' at the lower end of threaded section 55'. Extending downwardly and angularly outwardly from the end of duct 126 are a plurality of lubricant ducts 128, 30,132,134 which terminate at bottom end face 136 to deliver lubricant to the workpiece hole.

Figure 11:
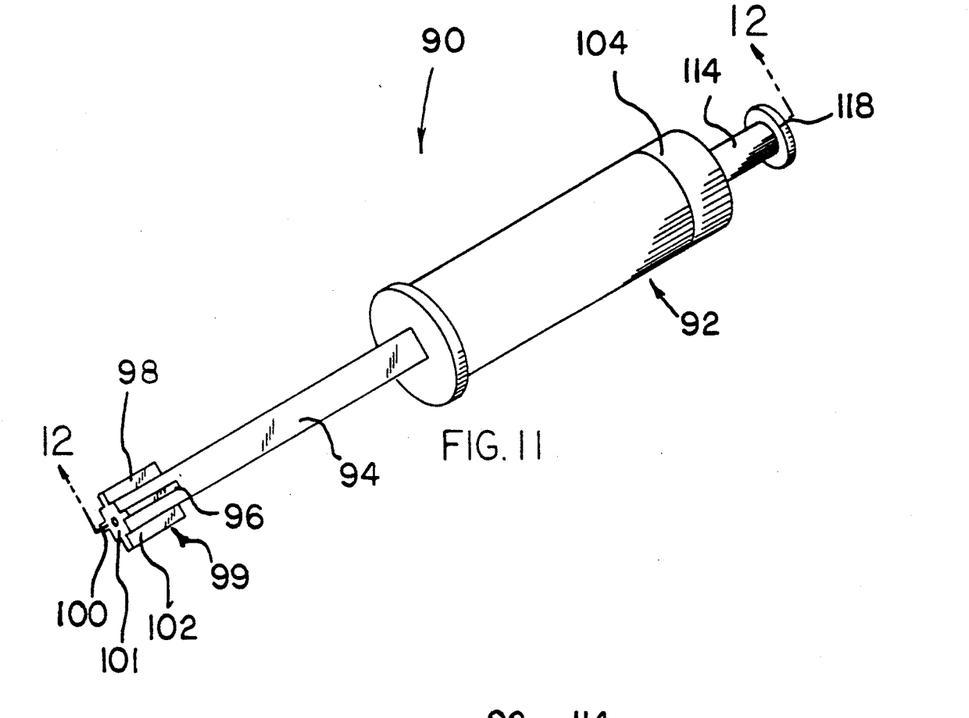
FIG. 11 is a perspective view of a third embodiment of a driving tool of the present invention.
Figure 12:
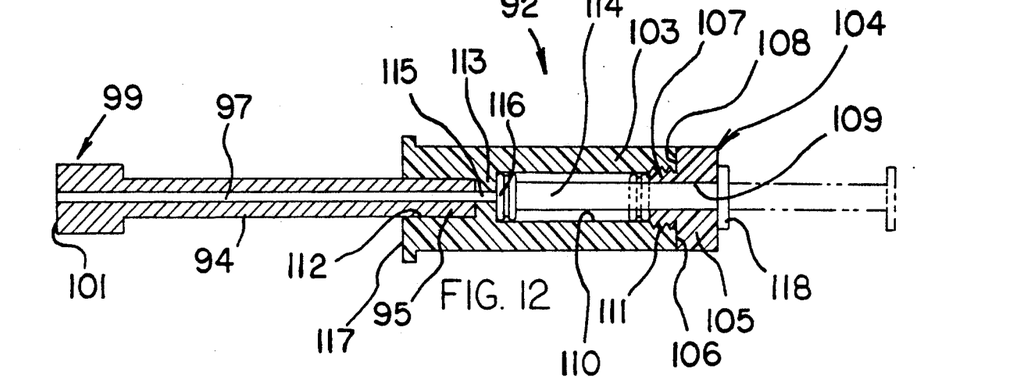
FIG. 12 is a cross-sectional view of the third embodiment of the driving tool of the present invention taken along line 12—12 in FIG. 11.

FIGS. 11 and 12 illustrate a third embodiment of a driving tool of the present invention. Driving tool 90 is constructed to drive either of the screw fasteners shown in FIGS. 13-19 and generally comprises a square elongate shank 94, a screw fastener driving section 99 at one end of the shank 94, and a handle 92 at an opposite end 95 of the shank 94. Driving section 99 is provided with four equally sized rectangular drive fins 96,98,100,102 extending inwardly from an end face 101 thereof and is structurally identical to driving sections 69 and 81 of driving tools 66 and 76, respectively. Handle 92 includes a cylindrical housing 103 having an annular end face 108. A sealing plug 104 is threadably mounted on one end of housing 103. Both the housing 103 and the sealing plug 104 may be constructed of polymeric material. Sealing plug 104 has a cylindrical section 105 having an annular end face 106. Extending axially from end face 106 of section 105 is a smaller diameter cylindrical section 107 which is externally threaded and integral with section 105. The outer diameter of section 105 and housing 103 are the same. Extending axially through sections 105 and 107 is a central bore 109. Housing 103 has a central bore 110 defining a lubricant reservoir. Central bore 110 is provided with a threaded portion 111 extending axially inwardly from end face 108 for a distance equal to the threaded length of sealing plug section 107 so that annular end faces 106 and 108 are in surface contact with each other in their fully assembled condition as shown in FIG. 12. Central bore 110 extends axially into housing 103 to a bottom end spaced from the opposite end of housing 103. Another central bore 112 extends axially inwardly from end face 117 at said opposite end of housing 103 to a bottom end spaced from the bottom end of central bore 110 to provide a separating wall 113 between bores 110 and 112. Wall 113 has a lubricant duct 115 extending centrally through it. End 95 of shank 94 is press fitted into bore 112. Shank 94 is further provided with a lubricant duct 97 extending centrally through it. Accordingly, central bore 110 and ducts 97,115 are axially aligned and interconnected. Slidably mounted in central bore 109 of sealing plug 104 is an elongate piston rod 114 having a piston 116 mounted on one end thereof, said piston being positioned within central bore 110 and in sliding contact with it. Mounted on the opposite end of piston rod 114 is a cylindrical operating disc 118 having a diameter greater than central bore 109, but less than the outer diameter of sealing plug section 105.

In use, sealing plug 104, piston rod 114, and piston 116 are separated from housing 103 by unscrewing plug 104 therefrom. A desired amount of lubricant is placed in central bore 110. Piston rod 114 is manually pulled to the dashed line position of FIG. 12 and plug 104, piston rod 114, and piston 116 are reassembled into housing 103. Driving section 99 of shank 94 is fully inserted into either drive socket 20' or 58' of screw fastener 10' or 54' positioned in a workpiece hole, respectively, i.e. so that end face 101 of driving section 99 is in contact with the flat bottom surface of either driving socket 20' or 58' of either screw fastener 10' or 54'. In that position, central bore 110, lubricant ducts 97,115, and either lubricant duct 120 or 126 of driving tool 90 and either screw fastener 10' or 54', respectively, are axially aligned. Force is then applied to disc 118 to push piston rod 114 and piston 116 to the solid line position shown in FIG. 12 to force lubricant from central bore 110, through lubricant ducts 115,97, and either lubricant ducts 120,122,124 or 126,128,130,132,134 of either screw fastener 10' or 54', respectively, into a workpiece hole prior to manually turning the driving tool 90 and either screw fastener in a selected rotative direction therein. Further, driving tool 90 may also be used to drive any of the screw fasteners of FIGS. 1-6, while either of driving tools 66 or 76 may be used to drive either of the fasteners of FIGS. 13-19 provided that prelubrication of the workpiece hole by delivery of a lubricant from the driving tool through the fastener is not desired.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. In combination, a screw fastener and a driving tool for turning said screw fastener in a workpiece hole, wherein said screw fastener has a central axis and comprises: an elongated shank, a threaded section on one end of said shank, and a head on an opposite end of said shank, wherein said head has a driving end face, and a polygonal driving socket extending inwardly into said head from said driving end face, wherein said polygonal driving socket is centered about said central axis and comprises a first section having a plurality of inwardly extending first flat side walls terminating at a first flat bottom wall, a second section having a plurality of slots, wherein each of said slots has a plurality of inwardly extending second flat side walls which terminate at a second flat bottom wall, wherein said first and second flat bottom walls are coplanar and form a common flat bottom surface for said polygonal driving socket, and wherein each of said slots intersects with a respective one of said first flat side walls and opens into said first section, and each of said slots radiates outwardly from the center of each of said first flat side walls, respectively;

wherein said driving tool comprises:
an elongate polygonal shank having a plurality of third flat side walls and an end face at one end thereof; and
a driving section on said one end of said polygonal shank, wherein said driving section includes a drive fin integral with and extending radially outwardly from the center of each of said third flat side walls, each of said drive fins extending longitudinally inwardly from said end face along a respective third flat side wall for a length at least equal to a depth of each of said screw fastener driving socket slots, said driving section further including a portion of said polygonal shank adjacent to said drive fins, said drive fins and said adjacent polygonal shank portion being complementary in shape to, and dimensioned to be snugly received in, said polygonal driving socket to effect turning of said screw fastener
wherein said driving tool further comprises a handle mounted on an opposite end of said polygonal shank for manually turning said driving tool;
wherein said screw fastener further comprises first lubricant conveying means extending axially through said elongate shank; and wherein said driving tool further comprises second lubricant conveying means for delivering lubricant from said driving tool, through said first lubricant conveying means of said screw fastener and into said workpiece hole.

2. The combination of claim 1, wherein said first section of said screw fastener driving socket is square, and said slots are rectangular and equally sized; and wherein said polygonal shank is square and said drive fins of said driving tool are rectangular and equally sized.

3. The combination of claim 1, wherein said first lubricant conveying means includes a first lubricant duct positioned along said central axis and extending longitudinally from said first bottom wall to an end spaced axially from a bottom end face of said shank at a lower end of said threaded section, and a plurality of second lubricant ducts extending outwardly from said first lubricant duct and terminating at an outer surface of said shank; and wherein said second lubricant conveying means includes a third lubricant duct extending axially through said polygonal shank and terminating at said end face thereof, wherein said handle includes a cylindrical housing, a polygonal first bore extending axially inwardly from one end of said housing to a first blind end, said opposite end of said polygonal shank being mounted in said first bore, a cylindrical second bore extending axially inwardly from an opposite end of said housing to a second blind end, said second bore providing a lubricant reservoir, said first and second blind ends being spaced from each other by a separating wall, said second bore having a threaded section extending inwardly from said opposite end of said housing, a fourth lubricant duct extending axially through said separating wall and connecting said second bore and said third lubricating duct, a sealing plug including a first cylindrical section having an annular end face and a diameter equal to that of the housing, a second cylindrical section integral with said first cylindrical section and extending axially from said annular end face, said second cylindrical section being threaded and having a diameter smaller than that of said first cylindrical section and substantially equal to that of said threaded section of said second bore, said second cylindrical section being threadably mounted in said threaded section of said second bore so that said annular end face is in surface contact with said opposite end of said housing, a cylindrical third bore extending axially through said sealing plug and opening into said second bore in said housing, an elongate piston rod having a piston mounted on one end thereof and an operating disc mounted on an opposite end thereof, said piston rod being slidably mounted in said third bore, said piston being slidably mounted in said second bore, and said operating disc being positioned externally of said housing, so that when said piston rod and said piston are pressed into said second bore by pushing against said operating disc, lubricant in said second bore is forced through said first, second, third, and fourth lubricant ducts and into said workpiece hole prior to turning the driving tool and the screw fastener.

4. The combination of claim 3, wherein said second lubricant ducts extend radially outwardly from said first lubricant duct and are axially spaced from each other at positions spaced from said bottom end face of said shank.

5. In combination, a screw fastener and a driving tool for turning and lubricating said screw fastener in a workpiece hole, wherein said screw fastener has a central axis and comprises;

an elongate shank, a threaded section on one end of said shank, and a head on an opposite end of said shank, wherein said head has a driving end face, and a driving socket extending inwardly into said head from said driving end face, wherein said driving socket is centered about said central axis and terminates at a bottom wall, and wherein said screw fastener further comprises first lubricant conveying means extending axially through said elongate shank;

wherein said driving tool comprises: an elongate shank having an end face at one end thereof;

a driving section on one end of said shank, said driving section extending longitudinally inwardly from said end face for a length at least equal to a depth of said driving socket into which said driving tool is inserted, said driving section being complementary in shape to, and dimensioned to be snugly received in, said driving socket to effect turning of said screw fastener;

a handle mounted on an opposite end of said shank for manually turning said driving tool; and a second lubricant conveying means for delivering lubricant from said driving tool, through said first lubricant conveying means of said screw fastener, and into said workpiece hole.

6. The combination of claim 5, wherein said first lubricant conveying means includes a first lubricant duct positioned along said central axis and extending longitudinally from said bottom wall to an end spaced axially from a bottom end face of said shank at a lower end of said threaded section, and a plurality of second lubricant ducts extending outwardly from said first lubricant duct and terminating at an outer surface of said shank; and wherein said second lubricant conveying means includes a third lubricant duct extending axially through said shank and terminating at said end face thereof, wherein said handle includes a cylindrical housing, a first bore extending axially inwardly from one end of said housing to a first blind end, said opposite end of said shank being mounted in said first bore, a cylindrical second bore extending axially inwardly from an opposite end of said housing to a second blind end, said second bore providing a lubricant reservoir, said first and second blind ends being spaced form each other by a separating wall, said second bore having a threaded section extending inwardly from said opposite end of said housing, a fourth lubricant duct extending axially through said separating all and connecting said second bore and said third lubricating duct, a sealing plug including a first cylindrical section having an annular end face and a diameter equal to that of the housing, a second cylindrical section integral with said first cylindrical section and extending axially from said annular end face, said second cylindrical section being threaded and having a diameter smaller than that of said first cylindrical section and substantially equal to that of said threaded section of said second bore, said second cylindrical section being threadably mounted in said threaded section of said second bore so that said annular end face is in surface contact with said opposite end of said housing, a cylindrical third bore extending axially through said sealing plug and opening into said second bore in said housing, an elongate piston rod having a piston mounted on one end thereof, said piston rod being slidably mounted in said third bore, said piston being slidably mounted in said second bore, and said operating disc being positioned externally of said housing, so that when said piston rod and said piston are pressed into said second bore by pushing against said operating disc, lubricant in said second bore is forced through said first, second, third, and fourth lubricant ducts and into said workpiece hole prior to turning the driving tool and the screw fastener.

7. The combination of claim 5, wherein said second lubricant ducts extend radially outwardly from said first lubricant duct and are axially spaced from each other at positions spaced from said bottom end face of said shank.

* * * * *